(12) United States Patent
Zhang et al.

(10) Patent No.: US 11,589,387 B2
(45) Date of Patent: Feb. 21, 2023

(54) SPATIAL LBT WITH BROADCAST/MULTICAST RECEPTION

(71) Applicant: QUALCOMM Incorporated, San Diego, CA (US)

(72) Inventors: Xiaoxia Zhang, San Diego, CA (US); Zhifei Fan, San Diego, CA (US); Seyed Ali Akbar Fakoorian, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 15/948,390

(22) Filed: Apr. 9, 2018

(65) Prior Publication Data

US 2018/0376505 A1     Dec. 27, 2018

Related U.S. Application Data

(60) Provisional application No. 62/522,963, filed on Jun. 21, 2017.

(51) Int. Cl.
     *H04W 74/08*        (2009.01)
     *H04L 12/18*        (2006.01)
     (Continued)

(52) U.S. Cl.
     CPC ....... *H04W 74/0816* (2013.01); *H04L 12/189* (2013.01); *H04W 4/06* (2013.01); *H04B 7/0617* (2013.01)

(58) Field of Classification Search
     CPC ......... H04W 74/0816; H04W 74/0808; H04W 74/08; H04W 74/085; H04W 74/0825;
     (Continued)

(56) References Cited

U.S. PATENT DOCUMENTS 9,398,585 B2 * 7/2016 Xu ..................... H04W 72/0426
2008/0063106 A1 * 3/2008 Hahm ................... H04L 1/0003
375/267

(Continued)

FOREIGN PATENT DOCUMENTS

EP      1249101 A2    10/2002

OTHER PUBLICATIONS

Partial International Search Report—PCT/US2018/038283—ISA/EPO—dated Sep. 17, 2018.
(Continued)

*Primary Examiner* — Un C Cho
*Assistant Examiner* — Rasha K Fayed
(74) *Attorney, Agent, or Firm* — Norton Rose Fullbright US LLP

(57) ABSTRACT

Spatial listen before talk (LBT) with broadcasting or multicasting reception is disclosed. Aspects of the disclosure provide for managing spatial LBT transmissions between broadcast communication nodes and neighboring cells. In one aspect, the broadcast transmitter transmits a preamble that identifies the broadcast transmission durations and the non-broadcast durations in the upcoming transmit opportunity. The potential interferer would read the preamble and yield any transmissions during the broadcast durations. Additional aspects provide for a periodic broadcast clear-to-send (CTS) signal transmitted by the broadcast receivers. The interferer may use the broadcast CTS to perform spatial LBT during the broadcast durations. Further aspects allow the broadcast receivers to determine when potential interferers would cause interference above a threshold. In such circumstances, the broadcast receivers would send the CTS to allow the interferer to perform spatial LBT during the broadcast durations.

20 Claims, 12 Drawing Sheets

(51) Int. Cl.
*H04W 4/06* (2009.01)
*H04B 7/06* (2006.01)

(58) Field of Classification Search
CPC ....... H04W 4/06; H04W 48/20; H04W 48/12; H04W 24/10; H04W 36/08; H04W 36/165; H04W 36/03; H04W 68/005; H04W 76/023; H04W 76/027; H04W 76/043; H04W 76/14; H04W 76/18; H04W 76/23; H04W 52/0212; H04W 52/16; H04W 52/244; H04W 52/34; H04W 72/082; H04W 72/046; H04W 72/0446; H04W 72/14; H04W 72/10; H04W 16/14; H04W 8/005; H04W 84/042; H04W 88/06; H04W 88/08; H04W 452/0212; H04W 452/16; H04W 452/244; H04W 452/34; H04L 5/0073; H04L 5/0053; H04L 5/0058; H04L 5/0048; H04L 5/0023; H04J 11/0023; H04B 7/0617; H04B 7/0413; H04B 7/0456; H04B 7/0854; H04B 7/043; H04B 7/0478; H04B 7/0417; H04B 7/0697

See application file for complete search history.

(56) References Cited

U.S. PATENT DOCUMENTS

| | | | | |
|---|---|---|---|---|
| 2012/0008511 A1* | 1/2012 | Fan | ...................... | H04J 11/0036 370/252 |
| 2012/0129517 A1* | 5/2012 | Fox | .................. | H04L 25/03987 455/425 |
| 2012/0250521 A1* | 10/2012 | Marinier | ............... | H04W 72/14 370/241 |
| 2013/0301509 A1* | 11/2013 | Purnadi | ............. | H04W 36/0007 370/312 |
| 2014/0036676 A1* | 2/2014 | Purnadi | ............. | H04W 36/0058 370/235 |
| 2014/0140237 A1* | 5/2014 | Ma | ........................ | H04W 4/021 370/252 |
| 2014/0226506 A1* | 8/2014 | Sadek | ................... | H04L 5/0073 370/336 |
| 2014/0233408 A1* | 8/2014 | Bontu | ............... | H04W 36/0085 370/252 |
| 2015/0009963 A1* | 1/2015 | Yang | ................ | H04W 36/00837 370/332 |
| 2015/0023185 A1* | 1/2015 | Bodas | ............... | H04W 72/0446 370/252 |
| 2015/0038148 A1* | 2/2015 | Park | ...................... | H04W 36/08 455/437 |
| 2015/0124686 A1* | 5/2015 | Zhang | ................... | H04W 88/08 370/312 |
| 2015/0282010 A1* | 10/2015 | Yang | ................. | H04W 36/0016 455/437 |
| 2015/0327156 A1* | 11/2015 | Ramkumar | ............. | H04L 5/001 370/312 |
| 2015/0351121 A1* | 12/2015 | Luo | ........................ | H04L 5/0048 370/329 |
| 2016/0073312 A1* | 3/2016 | Sridhar | ................. | H04W 48/16 370/235 |
| 2016/0286454 A1* | 9/2016 | Mager | ............... | H04W 36/0007 |
| 2016/0353340 A1* | 12/2016 | Yang | ................. | H04W 36/0058 |
| 2016/0360462 A1* | 12/2016 | Chockalingam | .. | H04W 36/0058 |
| 2016/0360464 A1* | 12/2016 | Han | ...................... | H04W 24/10 |
| 2017/0013628 A1* | 1/2017 | Kim | ...................... | H04W 56/002 |
| 2017/0026948 A1* | 1/2017 | Yang | ................. | H04W 72/0406 |
| 2017/0048889 A1* | 2/2017 | Kadous | ............. | H04W 72/0446 |
| 2017/0127330 A1* | 5/2017 | Payyappilly | .......... | H04W 36/14 |
| 2018/0124673 A1* | 5/2018 | Tenny | ................... | H04L 5/0091 |
| 2018/0288667 A1* | 10/2018 | Xie | ........................ | H04W 48/20 |
| 2019/0289549 A1* | 9/2019 | Lim | ................... | H04W 52/0235 |
| 2019/0387440 A1* | 12/2019 | Yiu | ................... | H04W 36/0072 |
| 2020/0022055 A1* | 1/2020 | Yan | ................. | H04W 36/00837 |
| 2020/0053661 A1* | 2/2020 | Yang | ................... | H04W 52/383 |
| 2020/0120518 A1* | 4/2020 | Geng | ........................ | H04J 11/00 |

OTHER PUBLICATIONS

International Search Report and Written Opinion—PCT/US2018/038283—ISA/EPO—dated Nov. 30, 2018.
European Search Report—EP20190971—Search Authority—The Hague—dated Oct. 5, 2020.

* cited by examiner

SPATIAL LBT WITH BROADCAST/MULTICAST RECEPTION

CROSS-REFERENCE TO RELATED APPLICATIONS

This application claims the benefit of U.S. Provisional Patent Application No. 62/522,963, entitled, "SPATIAL LBT WITH BROADCAST/MULTICAST RECEPTION," filed on Jun. 21, 2017, which is expressly incorporated by reference herein in its entirety.

BACKGROUND

Field

Aspects of the present disclosure relate generally to wireless communication systems, and more particularly, to spatial listen before talk (LBT) with broadcasting or multicasting reception.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication, includes detecting, by a potential interfering node, a preamble transmitted from a neighboring transmitter, wherein the preamble identifies one or more broadcast/multicast transmission locations and one or more non-broadcast/multicast transmission locations from the neighboring transmitter to one or more neighboring receivers, refraining, by the potential interfering node, from transmission of data to a served receiver node of the potential interfering node during the one or more broadcast/multicast transmission locations, and transmitting, by the potential interfering node, the data to the served receiver node during the one or more non-broadcast/multicast transmission locations.

In an additional aspect of the disclosure, a method of wireless communication, includes detecting, by a potential interfering node, a broadcast clear-to-send (CTS) signal from one or more neighboring broadcast receivers, determining, by the potential interfering node, an orthogonal beam for spatial listen before talk (LBT) transmissions, wherein the orthogonal beam is determined using the broadcast CTS signal, detecting, by the potential interfering node, a preamble transmitted from a neighboring broadcast transmitter, wherein the preamble identifies one or more broadcast/multicast transmission locations and one or more non-broadcast/multicast transmission locations from the neighboring transmitter to the one or more neighboring broadcast receivers, and transmitting, by the potential interfering node, data to a served receiver node served by the potential interfering node during the one or more broadcast/multicast transmission locations, wherein the data is transmitted using the orthogonal beam.

In an additional aspect of the disclosure, a method of wireless communication, includes measuring, by a UE configured for broadcast communications from a broadcast transmitter, a signal strength for each of one or more neighboring base stations, entering, by the UE, a connected state in response to the signal strength exceeding a threshold signal strength, and transmitting, by the UE, a broadcast CTS signal once entered into the connected state.

In an additional aspect of the disclosure, an apparatus configured for wireless communication includes means for detecting, by a potential interfering node, a preamble transmitted from a neighboring transmitter, wherein the preamble identifies one or more broadcast/multicast transmission locations and one or more non-broadcast/multicast transmission locations from the neighboring transmitter to one or more neighboring receivers, means for refraining, by the potential interfering node, from transmission of data to a served receiver node of the potential interfering node during the one or more broadcast/multicast transmission locations, and means for transmitting, by the potential interfering node, the data to the served receiver node during the one or more non-broadcast/multicast transmission locations.

In an additional aspect of the disclosure, an apparatus configured for wireless communication includes means for detecting, by a potential interfering node, a broadcast CTS signal from one or more neighboring broadcast receivers, means for determining, by the potential interfering node, an orthogonal beam for spatial LBT transmissions, wherein the orthogonal beam is determined using the broadcast CTS signal, means for detecting, by the potential interfering node, a preamble transmitted from a neighboring broadcast transmitter, wherein the preamble identifies one or more broadcast/multicast transmission locations and one or more non-broadcast/multicast transmission locations from the neighboring transmitter to the one or more neighboring broadcast receivers, and means for transmitting, by the potential interfering node, data to a served receiver node served by the potential interfering node during the one or more broadcast/multicast transmission locations, wherein the data is transmitted using the orthogonal beam.

In an additional aspect of the disclosure, an apparatus configured for wireless communication includes means for measuring, by a UE configured for broadcast communications from a broadcast transmitter, a signal strength for each of one or more neighboring base stations, means for entering, by the UE, a connected state in response to the signal strength exceeding a threshold signal strength, and means for transmitting, by the UE, a broadcast CTS signal once entered into the connected state.

In an additional aspect of the disclosure, a non-transitory computer-readable medium having program code recorded thereon. The program code further includes code to detect, by a potential interfering node, a preamble transmitted from a neighboring transmitter, wherein the preamble identifies one or more broadcast/multicast transmission locations and one or more non-broadcast/multicast transmission locations from the neighboring transmitter to one or more neighboring receivers, code to refrain, by the potential interfering node, from transmission of data to a served receiver node of the potential interfering node during the one or more broadcast/multicast transmission locations, and code to transmit, by the potential interfering node, the data to the served receiver node during the one or more non-broadcast/multicast transmission locations.

In an additional aspect of the disclosure, a non-transitory computer-readable medium having program code recorded thereon. The program code further includes code to detect, by a potential interfering node, a broadcast CTS signal from one or more neighboring broadcast receivers, code to determine, by the potential interfering node, an orthogonal beam for spatial LBT transmissions, wherein the orthogonal beam is determined using the broadcast CTS signal, code to detect, by the potential interfering node, a preamble transmitted from a neighboring broadcast transmitter, wherein the preamble identifies one or more broadcast/multicast transmission locations and one or more non-broadcast/multicast transmission locations from the neighboring transmitter to the one or more neighboring broadcast receivers, and code to transmit, by the potential interfering node, data to a served receiver node served by the potential interfering node during the one or more broadcast/multicast transmission locations, wherein the data is transmitted using the orthogonal beam.

In an additional aspect of the disclosure, a non-transitory computer-readable medium having program code recorded thereon. The program code further includes code to measure, by a UE configured for broadcast communications from a broadcast transmitter, a signal strength for each of one or more neighboring base stations, code to enter, by the UE, a connected state in response to the signal strength exceeding a threshold signal strength, and code to transmit, by the UE, a broadcast CTS signal once entered into the connected state.

In an additional aspect of the disclosure, an apparatus configured for wireless communication is disclosed. The apparatus includes at least one processor, and a memory coupled to the processor. The processor is configured to detect, by a potential interfering node, a preamble transmitted from a neighboring transmitter, wherein the preamble identifies one or more broadcast/multicast transmission locations and one or more non-broadcast/multicast transmission locations from the neighboring transmitter to one or more neighboring receivers, code to refrain, by the potential interfering node, from transmission of data to a served receiver node of the potential interfering node during the one or more broadcast/multicast transmission locations, and code to transmit, by the potential interfering node, the data to the served receiver node during the one or more non-broadcast/multicast transmission locations.

In an additional aspect of the disclosure, an apparatus configured for wireless communication is disclosed. The apparatus includes at least one processor, and a memory coupled to the processor. The processor is configured to detect, by a potential interfering node, a broadcast CTS signal from one or more neighboring broadcast receivers, to determine, by the potential interfering node, an orthogonal beam for spatial LBT transmissions, wherein the orthogonal beam is determined using the broadcast CTS signal, to detect, by the potential interfering node, a preamble transmitted from a neighboring broadcast transmitter, wherein the preamble identifies one or more broadcast/multicast transmission locations and one or more non-broadcast/multicast transmission locations from the neighboring transmitter to the one or more neighboring broadcast receivers, and to transmit, by the potential interfering node, data to a served receiver node served by the potential interfering node during the one or more broadcast/multicast transmission locations, wherein the data is transmitted using the orthogonal beam.

In an additional aspect of the disclosure, an apparatus configured for wireless communication is disclosed. The apparatus includes at least one processor, and a memory coupled to the processor. The processor is configured to measure, by a UE configured for broadcast communications from a broadcast transmitter, a signal strength for each of one or more neighboring base stations, to enter, by the UE, a connected state in response to the signal strength exceeding a threshold signal strength, and to transmit, by the UE, a broadcast CTS signal once entered into the connected state.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
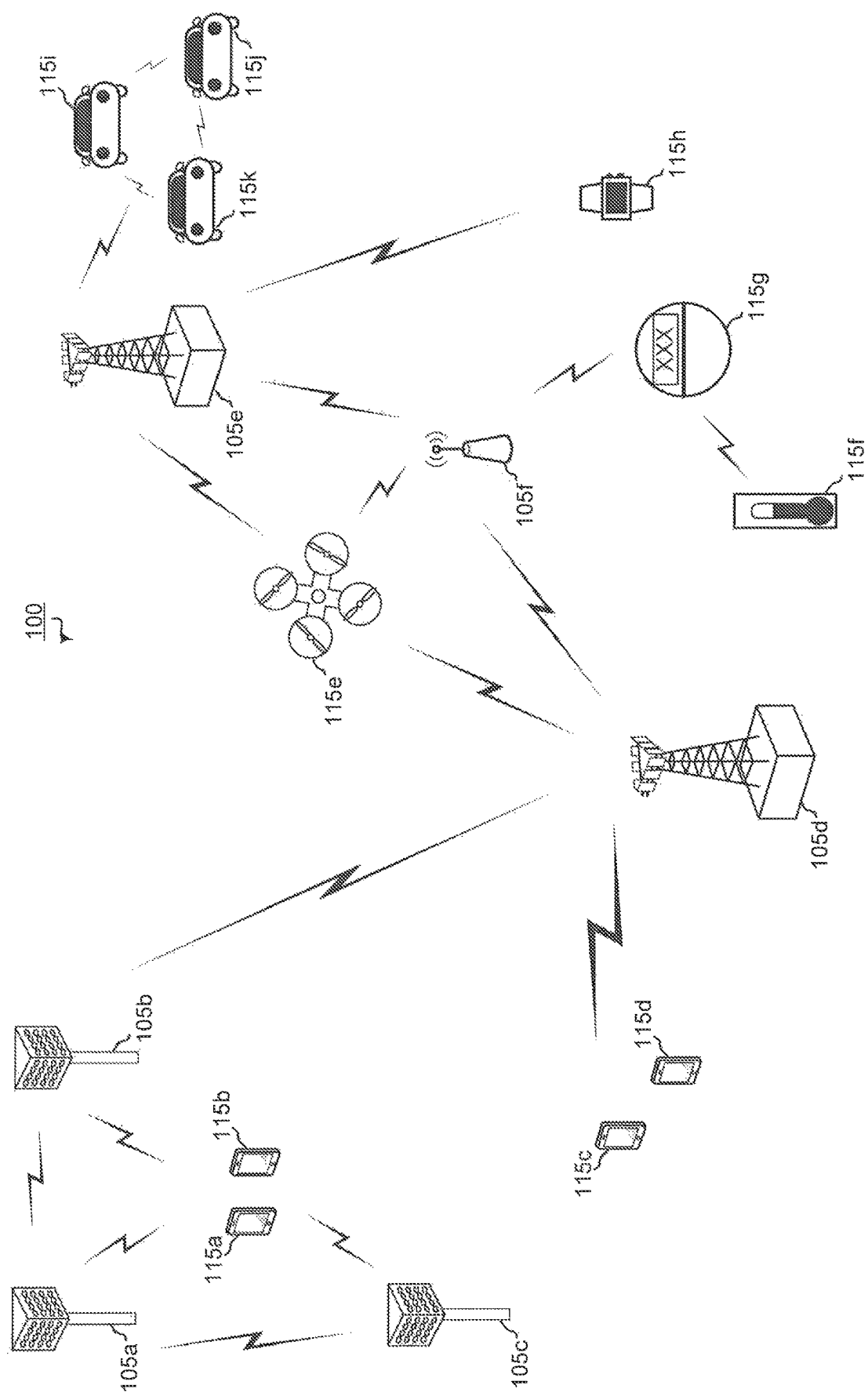
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
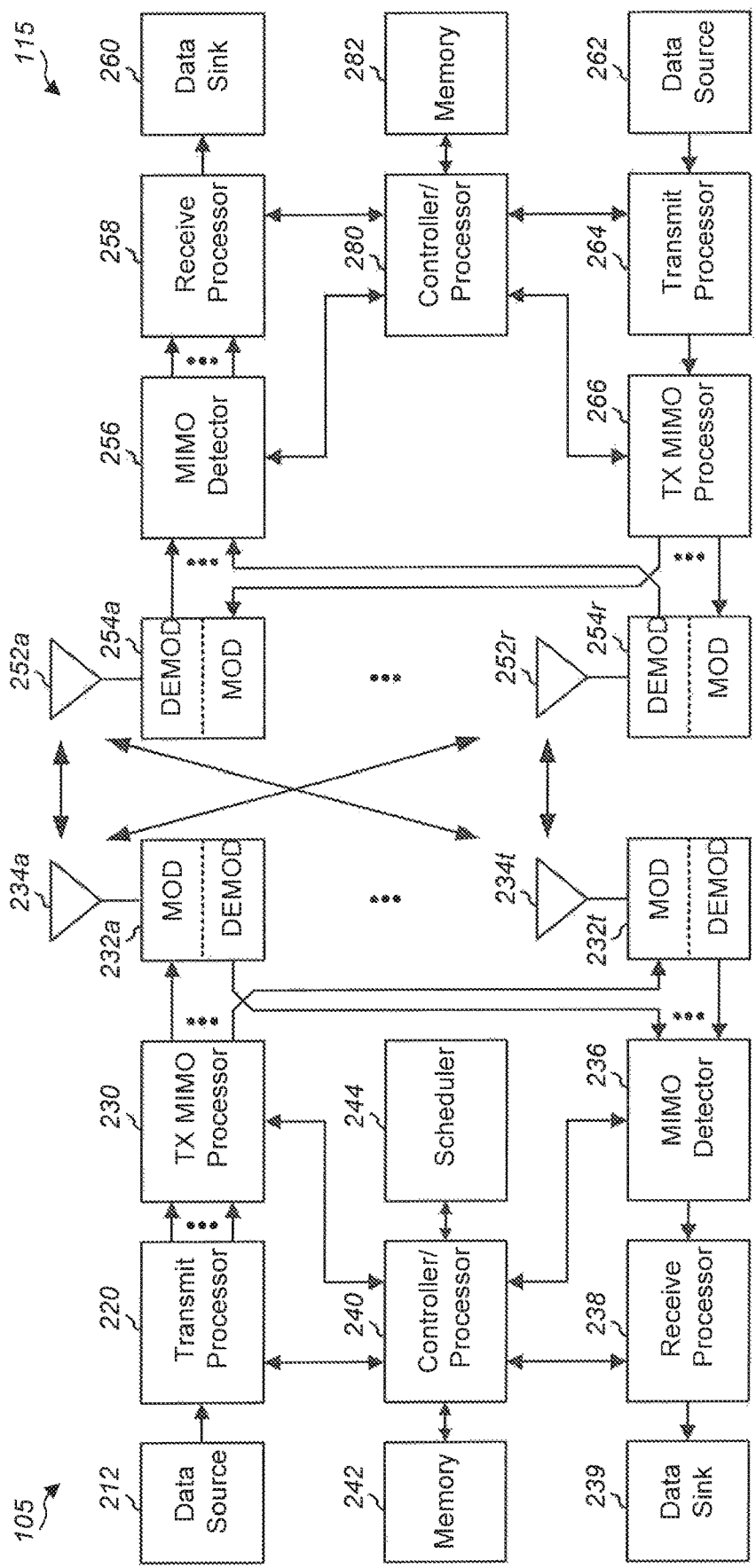
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5, 7, and 9, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
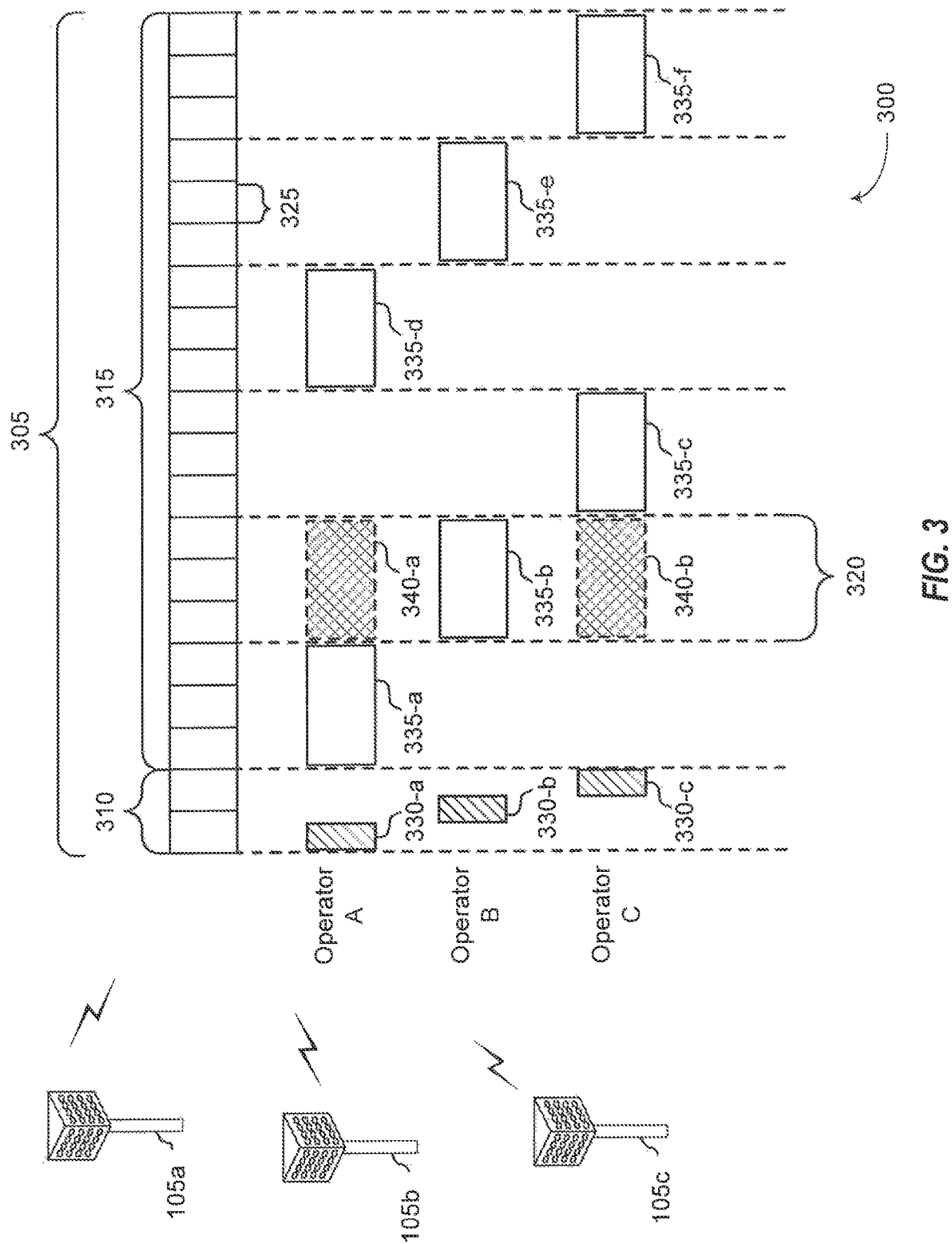
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Spatial listen before talk (LBT) transmission has been proposed in node implementations with multiple antennas. Compared to the traditional omni-directional LBT, a spatial LBT allows a node to transmit on the over an existing transmission by using the multiple spatial dimensions associated with the multiple antennas. With spatial LBT, the transmitter node measures the energy on the orthogonal space of the existing receive direction and determines how to transmit within the null space.

Figure 4:
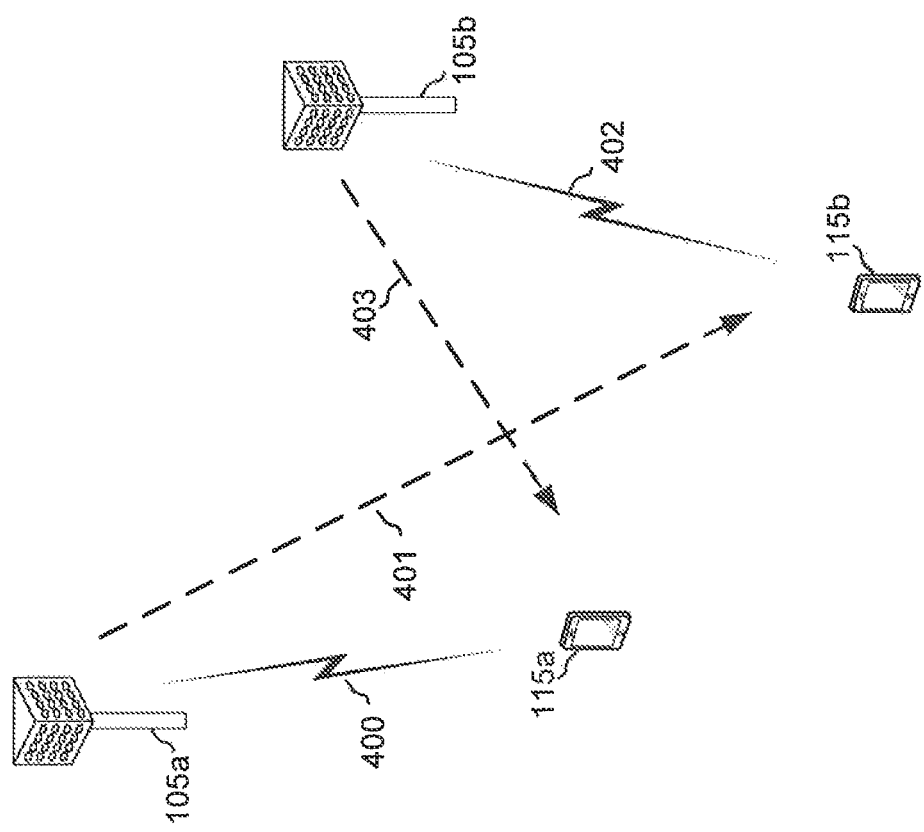
FIG. 4 is a block diagram illustrating gNBs and communicating over shared transmission media with UEs.

FIG. 4 is a block diagram illustrating gNBs 105a and 105b communicating over shared transmission media with UEs 115a and 115b. Each of the communications pairs of gNB 105a-UE 115a and gNB 105b-UE 115b may communicate using different links over the shared transmission media. In this first example implementation described according to the illustration of FIG. 4, first link 400 between gNB 105a and UE 115a is a 1×1 link, having a single receive antennas and a single transmit antenna. Communication between gNB 105a and UE 115a count down their random number first for contention window access and occupy first link 400 before the communication pair of gNB 105b-UE 115b. The link between gNB 105b and UE 115b, second link 402 is a 2×2 link, having two receive antennas and two transmit antennas. Moreover UE 115a is geographically close to gNB 105b. Traditionally, gNB 105b would observe high energy from UE 115a and, in response, would refrain from transmission so as not to cause interference to UE 115a. However, by using spatial LBT, gNB 105b may transmit in the unused orthogonal space of first link 400 to ensure that its transmission of second link 401 causes minimal interference to UE 115a. This may be achieved by using the two transmit antennas on gNB 105b.

For example, with its 1×1 first link 400, gNB 105b as the transmitter detects unused orthogonal spectrum 401 (e.g., null space, null spectrum) and its 2×2 second link 402 as a transmission within unused orthogonal spectrum 401. gNB 105b may implement such transmission either by using beamforming of beam 403 and second link 402, or may transmit data to UE 115b on second link 402 and transmit a nulling signal on beam 403 that is formed to cancel or reduce interference seen by UE 115a from the transmission of data on second link 402.

Using spatial LBT, thus, increases the medium utilization by exploiting the spatial dimension. However, it may cause the receiver to send CTS signals so that the interferer can measure the cross-link channel and determine on the orthogonal beam or null space within which to transmit. For unicast reception, receiving UEs are in generally in a connected state. Thus, CTS can be transmitted without introducing significant UE complexity and network overhead. However, for broadcast/multicast (e.g., MBMS, SIB, etc.) reception, the receiving UEs may not be in a connected state, and there may further be a large number of UEs to receive the broadcast/multicast signaling. It would not be desirable to have so many broadcast/multicast receiving UEs enter connected state and each individually send CTS signals. In addition, the CTS transmission from so many UEs may also introduce significant network overhead. This would greatly increase both the UE power consumption as well as system load and overhead.

Figure 5:
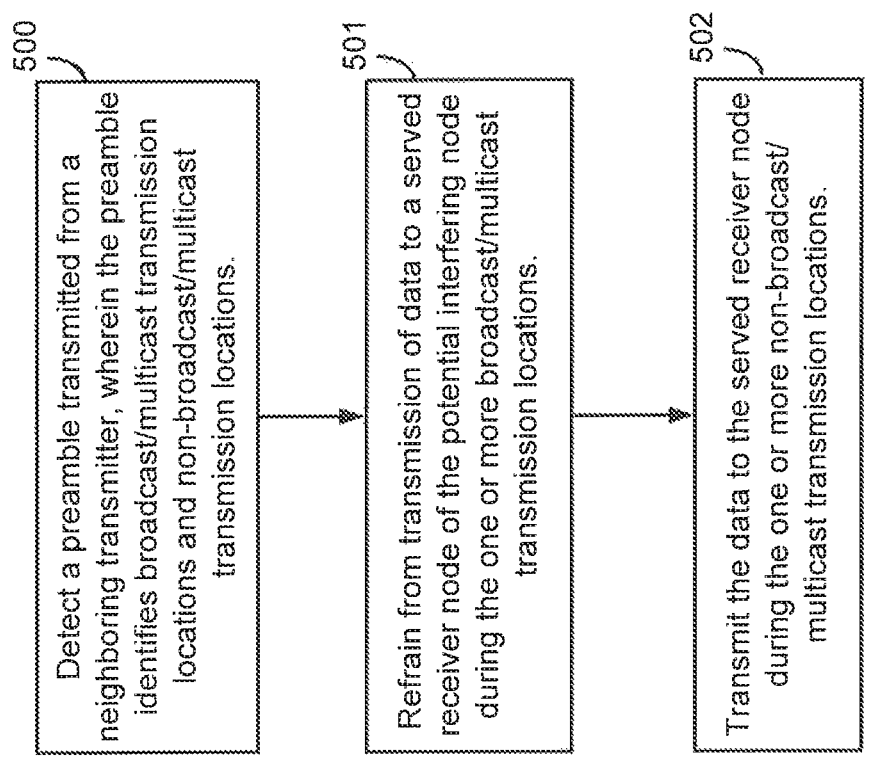
FIG. 5 is a block diagram illustrating example blocks executed to implement one aspect of the present disclosure.
Figure 11:
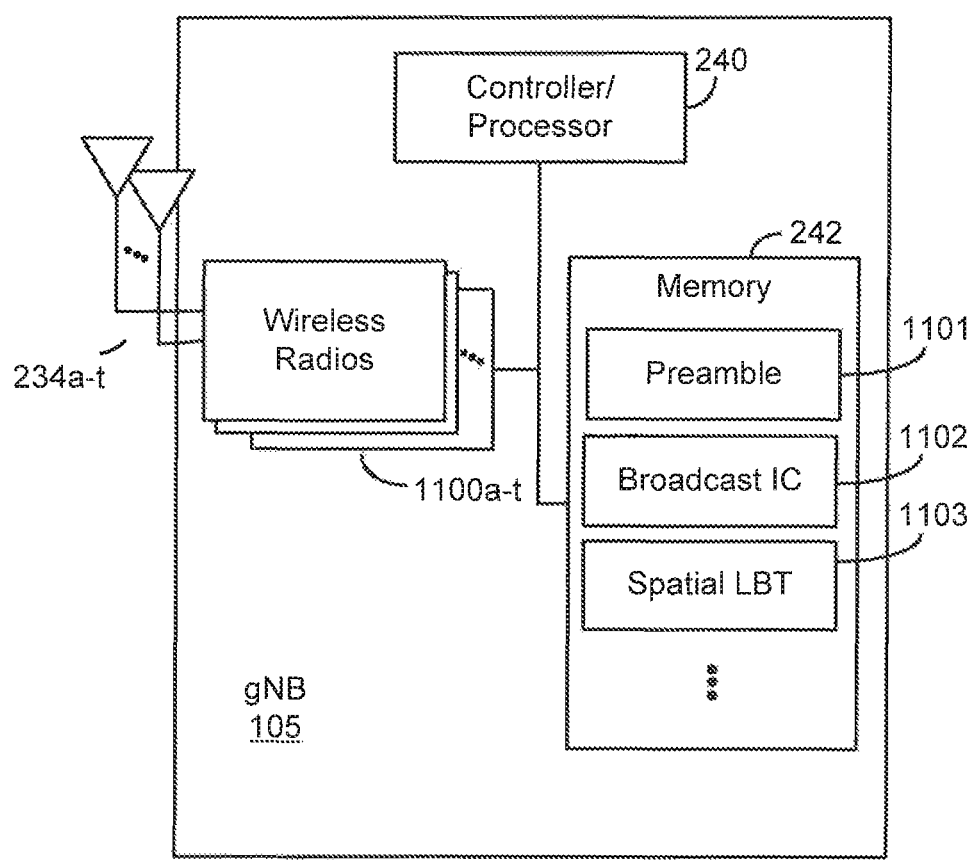
FIG. 11 is a block diagram illustrating an example base station configured according to aspects of the present disclosure.

FIG. 5 is a block diagram illustrating example blocks executed to implement one aspect of the present disclosure. The example blocks will also be described with respect to eNB 105 as illustrated in FIG. 11. FIG. 11 is a block diagram illustrating gNB 105 configured according to one aspect of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 1100a-t and antennas 234a-t. Wireless radios 1100a-t includes various components and hardware, as illustrated in FIG. 2 for gNB 105, including modulator/demodulators 232a-t, MIMO detector 236, receive processor 238, transmit processor 220, and TX MIMO processor 230.

At block 500, a potential interfering node detects a preamble transmitted from a neighboring transmitter, wherein the preamble identifies broadcast/multicast transmission locations and non-broadcast/multicast transmission locations from the neighboring transmitter to neighboring receivers. For example, the broadcast base station transmits the preamble that identifies which transmit time interval (TTI) or time duration is for broadcast/multicast transmission and which TTI/time duration is for non-broadcast/multicast transmission. gNB 105, as the potential interferer may detect the preamble via wireless radios 1100a-t and antennas 234a-t and then stored the preamble at preamble 1101 in memory 242. Thus, both locations of the broadcast/multicast TTI/time duration and non-broadcast/multicast TTI/time duration would also be at preamble 1101.

At block 501, the potential interfering node refrains from transmission of data to a served receiver node of the potential interfering node during the broadcast/multicast transmission locations. Under control of controller/processor 240, gNB 105 executes broadcast interference cancellation (IC) logic 1102, stored in memory 242. In the execution environment of broadcast IC logic 1102, upon detection of the preamble for the broadcast base station, the potential interferer, gNB 105, yields any data transmissions on the broadcast/multicast TTI/time duration. In such manner, the interferer, gNB 105, does not cause interference with the broadcast receiver. At block 502, the potential interfering node transmits the data to the served receiver node during the one or more non-broadcast/multicast transmission locations. The interferer, gNB 105, may transmit data via wireless radios 1100a-t and antennas 234a-t during the non-broadcast/multicast TTI/time durations whether or not the broadcast transmitter is transmitting to the neighboring UEs. If a CTS is detected, the interferer, gNB 105, may perform spatial LBT with the data transmission during the non-broadcast/multicast durations. Under control of controller/processor 240, gNB 105 executes spatial LBT logic 1103, stored in memory 242. The execution environment of spatial LBT logic 1103 allows gNB 105 to determine the orthogonal beam in the null space of the other transmissions to the neighboring UEs and use this orthogonal beam for spatial LBT of the data over on-going neighboring transmission during the non-broadcast/multicast durations.

Figure 6:
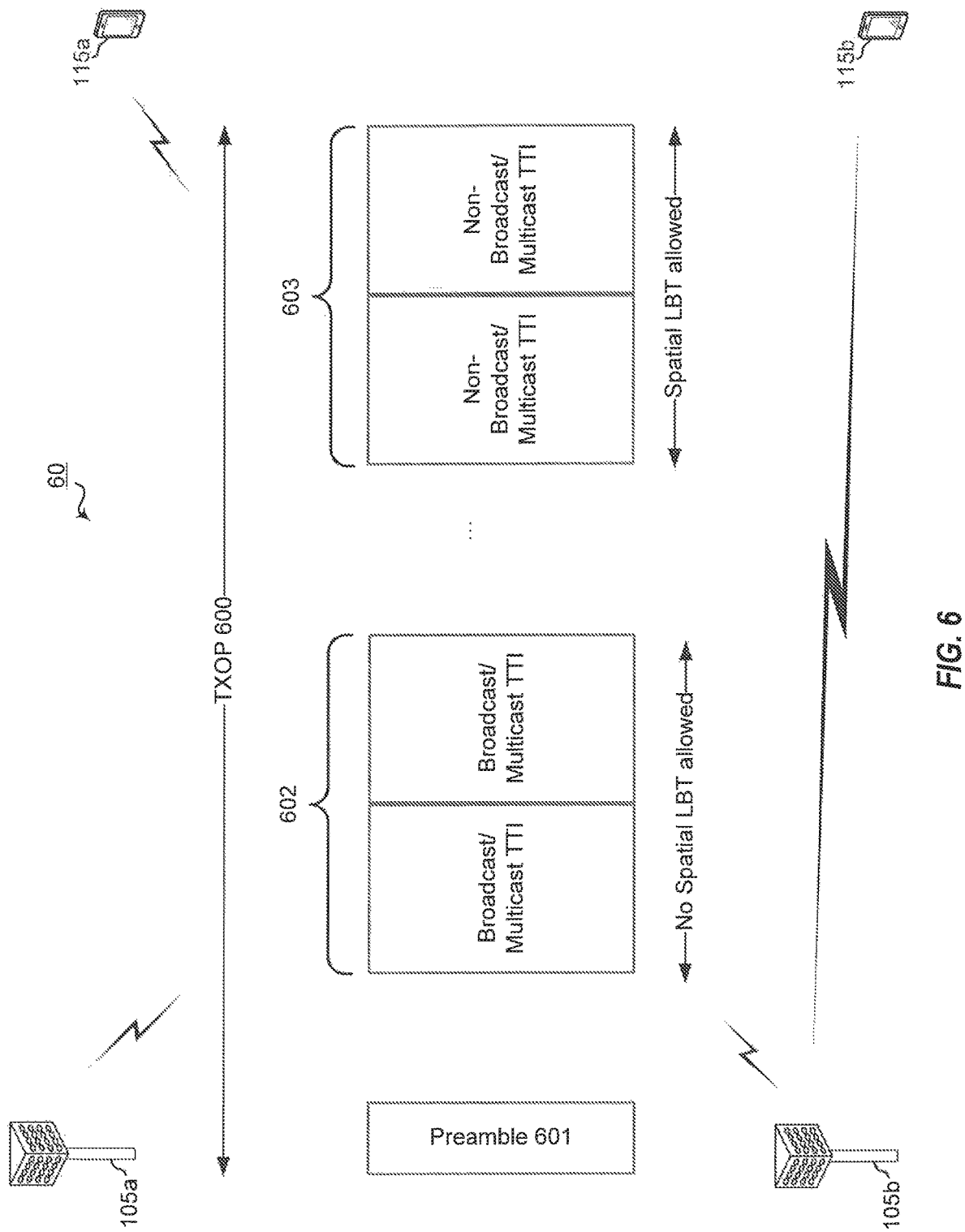
FIG. 6 is a block diagram illustrating a network configured according to one aspect of the present disclosure.

FIG. 6 is a block diagram illustrating network 60 configured according to one aspect of the present disclosure. The broadcast/multicast transmissions (e.g., MBMS, SIB, etc.) are protected by a preamble 601 transmitted from the broadcast transmitter 105a. Preamble 601 identifies the configuration of transmit opportunity 600 by identifying broadcast/multicast TTIs 602, where no spatial LBT is allowed, and non-broadcast/multicast TTIs 603, where spatial LBT is allowed. Broadcast transmitter 105a sends preamble 601 to silence potential interferer 105b. Potential interferer 105b is not allowed to perform spatial LBT to transmit during broadcast/multicast TTIs 602, even if it does not observe any CTS signals or it obtains the orthogonal beam in the null space. Potential interferer 105b can perform spatial LBT to transmit data to UE 115b during non-broadcast/multicast TTIs 603. Potential interferer 105b can perform spatial LBT on top of the ongoing non-broadcast/multicast transmission in non-broadcast/multicast TTIs 603.

In an additional aspect of the present disclosure, spatial LBT transmissions may be allowed during broadcast/multicast reception. Such transmissions are implemented by a semi-static broadcast preamble/request-to-send (RTS) and CTS that is exchanged periodically between the broadcast transmitter and broadcast receivers.

Figure 7:
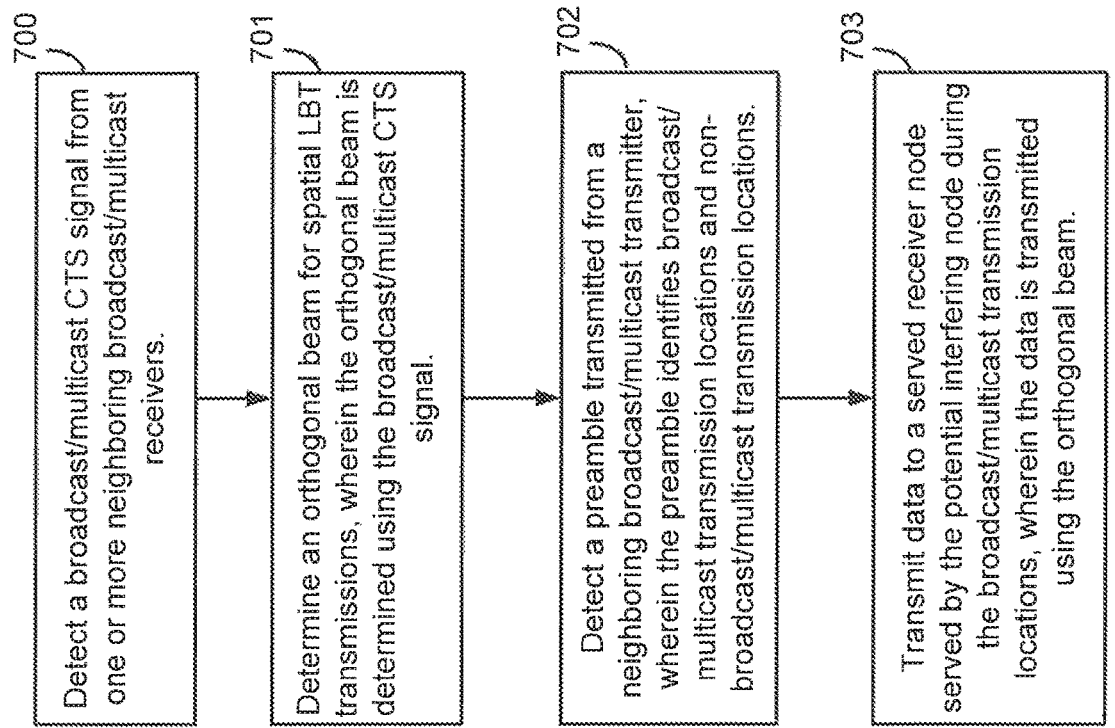
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to eNB 105 as illustrated in FIG. 11. At block 700, a potential interfering node detects a broadcast CTS signal from one or more neighboring broadcast receivers. During broadcast communications, the broadcast receivers periodically transmit a CTS for the broadcast communications, which the potential interferer, gNB 105, may detect via antennas 234*a-t* and wireless radios 1100*a-t*.

At block 701, the potential interfering node determines an orthogonal beam for spatial LBT transmissions, wherein the orthogonal beam is determined using the broadcast CTS signal. The detecting of the CTS prompts the potential interferer, gNB 105, to execute spatial LBT 1103. The execution environment of spatial LBT 1103 allows gNB 105 to determine an orthogonal beam in the null space for the spatial LBT transmission over the neighboring broadcast transmission.

At block 702, the potential interfering node detects a preamble transmitted from a neighboring broadcast transmitter, wherein the preamble identifies one or more broadcast/multicast transmission locations and one or more non-broadcast/multicast transmission locations from the neighboring transmitter to the one or more neighboring broadcast receivers. The broadcast transmitter will also transmit a preamble, similar to preamble 601, which identifies the broadcast/multicast and non-broadcast/multicast durations. gNB 105, as the potential interferer, detects the preamble via wireless radios 1100*a-t* and antennas 234*a-t* and then stores the preamble at preamble 1101 in memory 242. Thus, both locations of the broadcast/multicast TTI/time duration and non-broadcast/multicast TTI/time duration would also be at preamble 1101.

At block 703, the potential interfering node transmits data to a served receiver node served by the potential interfering node during the one or more broadcast/multicast transmission locations, wherein the data is transmitted using the orthogonal beam. In the described aspect, spatial LBT transmissions may be made during the broadcast/multicast durations using the orthogonal beam determined from the broadcast CTS. When no CTS is detected by gNB 105, it may transmit data, whether during the broadcast/multicast or non-broadcast/multicast durations, via wireless radios 1100*a-t* and antennas 234*a-t* using any available channel resources. If CTS is detected, however, the execution environment of spatial LBT 1103 allows the potential interferer, gNB 105, to determine the orthogonal beam in the null space of the other transmissions to the neighboring UEs and use this orthogonal beam for spatial LBT of the data over on-going neighboring transmission either during the broadcast/multicast or non-broadcast/multicast durations.

Figure 8:
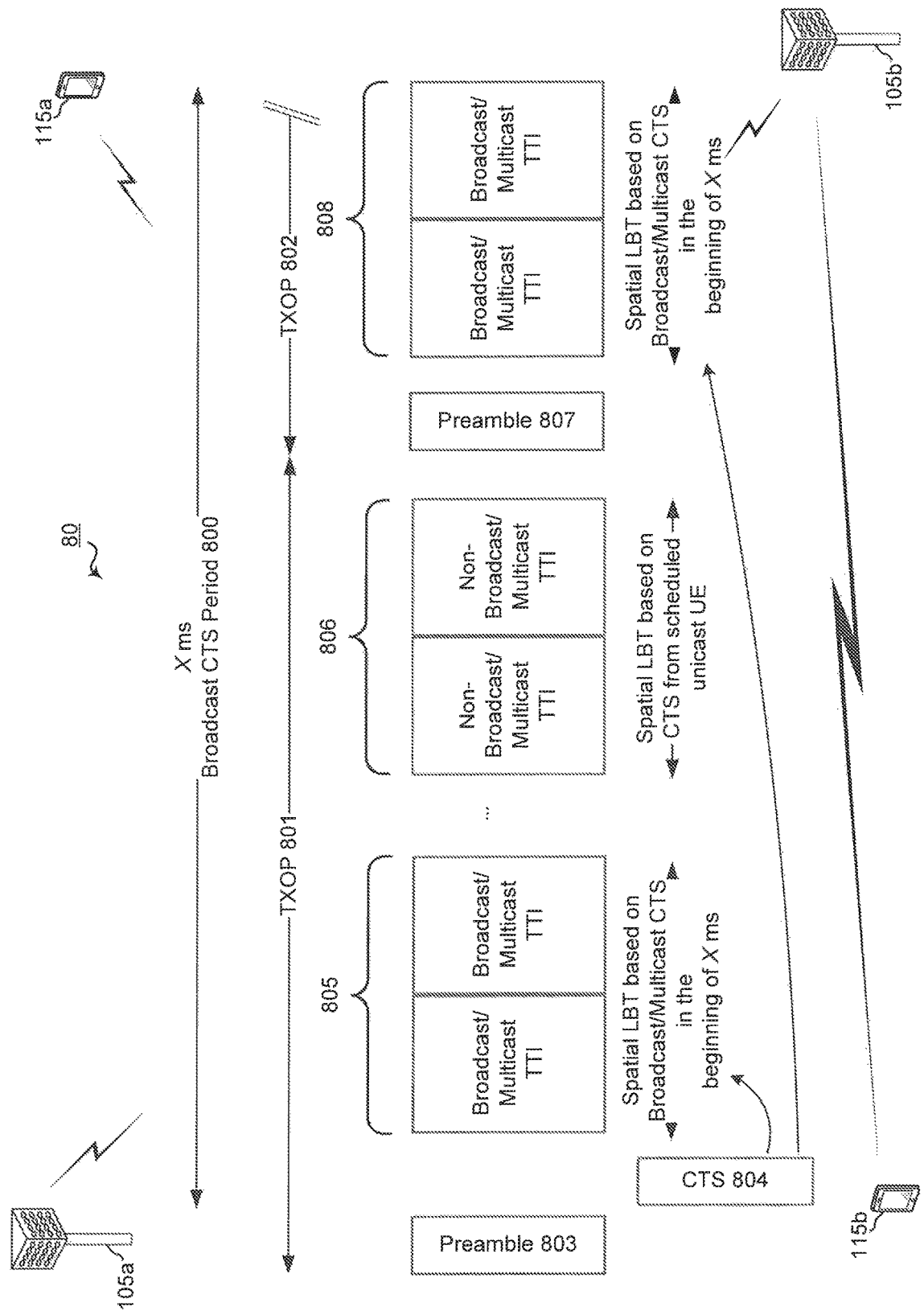
FIG. 8 is a block diagram illustrating a network configured according to one aspect of the present disclosure.

FIG. 8 is a block diagram illustrating network 80 configured according to one aspect of the present disclosure. As described with respect to FIG. 7, the broadcast transmitter and receivers exchange RTS/CTS periodically. For example, broadcast transmitter 105*a* transmits preamble 803, and broadcast receiver 115*a* transmits CTS 804 and 807 to broadcast transmitter 105*a* every broadcast CTS period 800 (X ms). Potential interferer 105*b* obtains the orthogonal beam based on the periodic CTS transmission, CTS 804, from broadcast receiver 115*a*. Within broadcast CTS period 800, potential interferer 105*b* can use the orthogonal beam determined in the beginning of broadcast CTS period 800 when it detects preamble 803 from broadcast transmitter 105*a* indicating broadcast/multicast TTIs 805 and non-broadcast/multicast TTIs 806 in transmit opportunity 801. Preamble 807 may provide identification of broadcast/multicast TTIs 808 and non-broadcast/multicast TTIs (not shown) in the subsequent transmit opportunity 802.

Spatial LBT transmissions are allowed and applied in both broadcast/multicast TTIs 805/808 and non-broadcast/multicast TTIs 806. The interfering node, potential interferer 105*b*, obtains the orthogonal beam for broadcast receiver 115*a* at the beginning of broadcast CTS period 800 after CTS 804 is detected by potential interferer 105*b*. Within broadcast CTS period 800, potential interferer 105*b* can transmit data to UE 115*b* with the orthogonal beam on broadcast/multicast TTIs 805/808 indicated by preamble 803/807, respectively. Potential interferer 105*a* can also perform spatial LBT for data to UE 115*b* using a different orthogonal beam on non-broadcast/multicast TTIs 806 based on CTS (not shown) that are detected from broadcast receiver 115*a* when broadcast receiver 115*a* is in a connected state and scheduled for unicast communication. As the broadcast CTS, such as CTS 804, are transmitted by broadcast receivers, such as broadcast receiver 115*a*, periodically, the resulting orthogonal beam determined for spatial LBT transmission during broadcast/multicast TTIs 805/808, may be considered a semi-static orthogonal beam based on the period.

It should be noted that the semi-static orthogonal beam for spatial LBT transmission during broadcast/multicast TTIs 805/808 could be more suited for mmW or massive MIMO implementations where the beam direction may also be considered semi-static over the period.

Additional aspects of the present disclosure may provide for an on-demand CTS transmission from the broadcast receivers. In such aspects, the broadcast receivers determine when the CTS transmission may be beneficial to avoid potential interferers.

Figure 9:
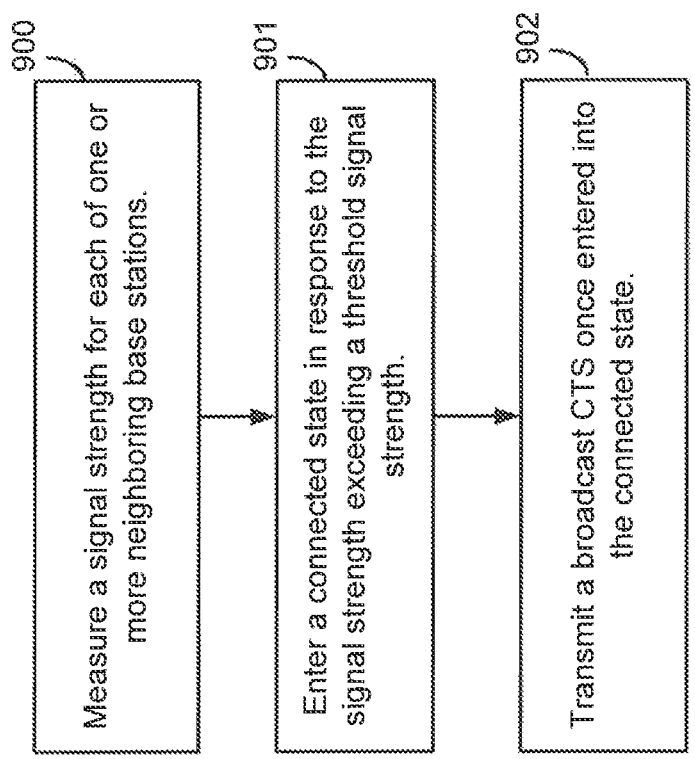
FIG. 9 is a block diagram illustrating example blocks executed to implement one aspect of the present disclosure.
Figure 12:
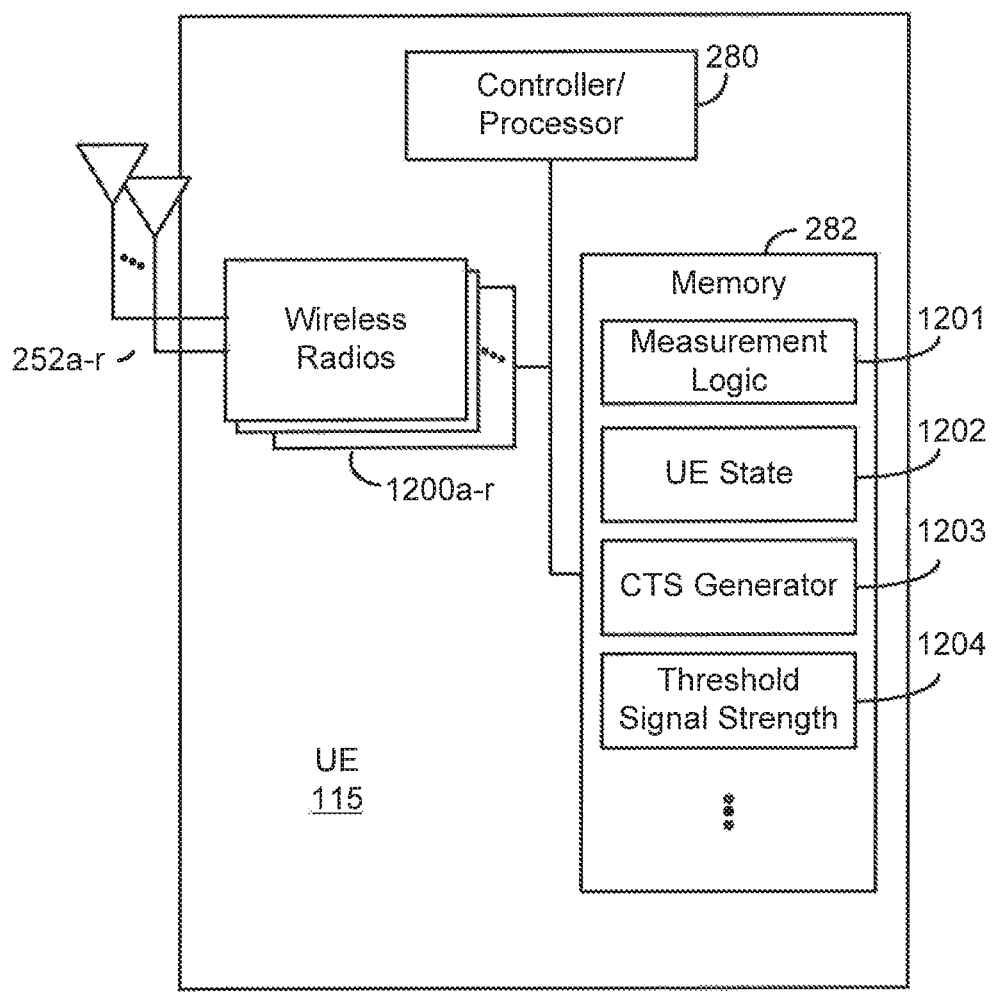
FIG. 12 is a block diagram illustrating an example UE configured according to aspects of the present disclosure.

FIG. 9 is a block diagram illustrating example blocks executed to implement one aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200*a-r* and antennas 252*a-r*. Wireless radios 1200*a-r* includes various components and hardware, as illustrated in FIG. 2 for eNB 105, including modulator/demodulators 254*a-r*, MIMO detector 256, receive processor 258, transmit processor 264, and TX MIMO processor 266.

At block 900, a UE configured for broadcast communications from a broadcast transmitter measures a signal strength for each of one or more neighboring base stations. In the present aspect, the UE is not in a connected state, but is configured to receive broadcast transmissions. The UE measures the signal strength of the surrounding base stations in order to evaluate a level of potential interference transmission from these neighbors may cause to its broadcast reception. The UE would obtain the broadcast/multicast area identifier (ID) (e.g., MBMS area ID) or public land mobile network (PLMN) ID for each of the surrounding neighbor base stations. The broadcast/multicast area ID or PLMN ID would indicate to the UE whether or not the neighboring base stations belong to a different multicast-broadcast single frequency network (MBSFN) or a different PLMN ID, which may indicate the neighbor base station being operated by a different network operator.

At block 901, the UE enters a connected state in response to the signal strength exceeding a threshold signal strength. For example, UE 115, under control of controller/processor 280, executes measurement logic 1201, stored in memory 282. The execution environment of measurement logic 1201 allows UE 115 to calculate the signal strength of the neighboring cells. When UE 115 determines that the measured signal strength exceeds threshold signal strength 1204, stored in memory 282, that would cause interference to any broadcast reception at UE 115, it will execute, under control of controller/processor 280, UE state logic 120 causing UE 115 to enter a connect state in preparation for transmissions.

At block 902, once the UE enters into the connected mode, it obtain the CTS configuration from the network and transmits a CTS signal to protect the reception of the broadcast signal. Once UE 115 enters the connected state, it executes CTS generator 1203, stored in memory 282, to generate the CTS. UE 115 also obtains the transmission resources from its serving base station for the CTS transmission. Once UE 115 obtains the transmission resources, it may transmit CTS via wireless radios 1200a-r and antennas 252a-r. The transmitted broadcast CTS alerts the relevant neighboring base stations to the neighboring broadcast transmissions and allows the neighboring base stations to determine an orthogonal beam in the null space for spatial LBT transmissions over the broadcast communications.

Figure 10:
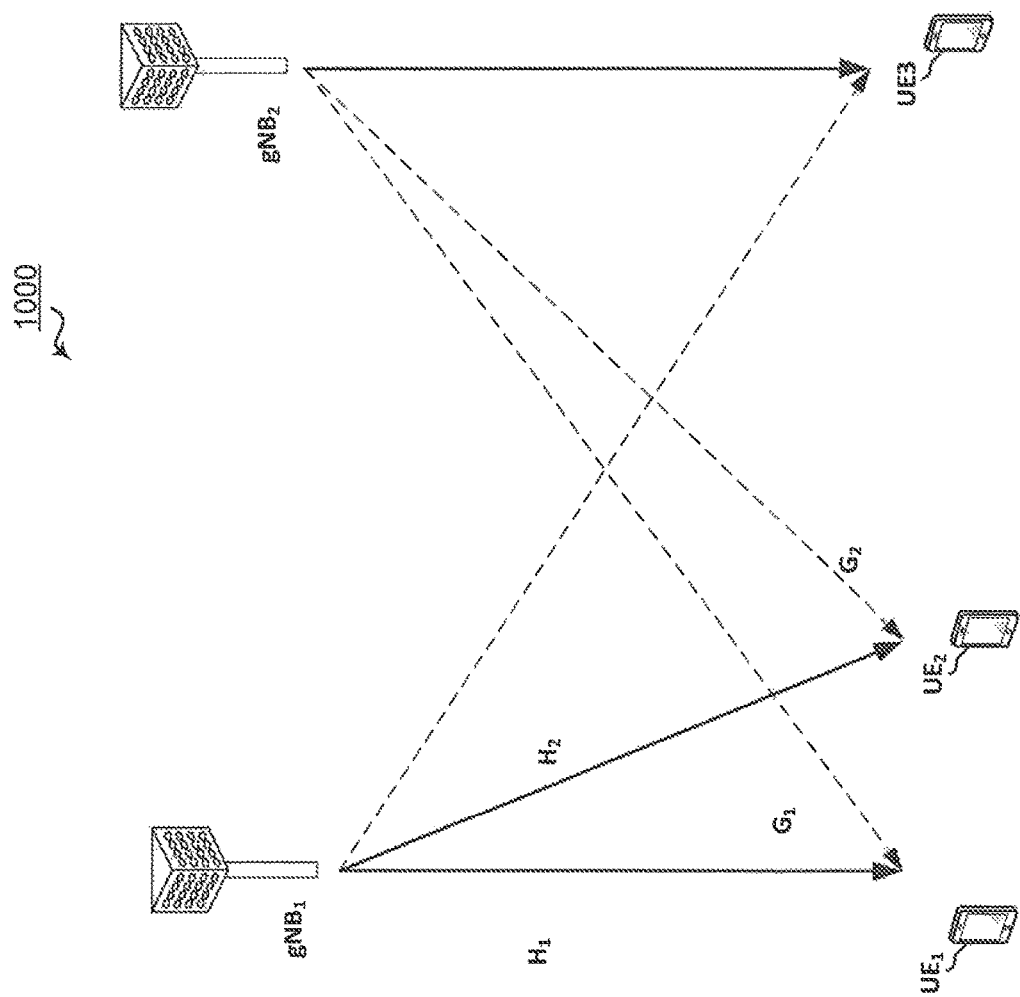
FIG. 10 is a block diagram illustrating a network configured according to one aspect of the present disclosure.

FIG. 10 is a block diagram illustrating network 1000 configured according to one aspect of the present disclosure. In the aspect illustrated in FIG. 10, the broadcast UEs ($UE_1$ and $UE_2$) transmit CTS when the channel environment would likely cause interference to the broadcast UEs. The broadcast UEs ($UE_1$ and $UE_2$) perform the neighbor cell measurements for each neighbor cell ($gNB_2$) with signal strength within a certain threshold compared to serving cell ($gNB_1$). Broadcast UEs ($UE_1$ and $UE_2$) acquire the broadcast/multicast area ID and/or PLMN ID for the neighbor cell either by reading the neighbor cell's ($gNB_2$) system information block (SIB) broadcast or in signaling from the serving cell ($gNB_1$). In LTE, the broadcast/multicast area ID or PLMN ID is generally transmitted in a base station's SIB. Thus, $UE_1$ and $UE_2$ may need to read SIB from $gNB_2$. LTE also supports service continuity, in which the serving cell ($gNB_1$) can transmit the service area of neighbor cell ($gNB_2$) or neighbor frequency in its own SIB. In such service continuity operations, $UE_1$ and $UE_2$ may not need to read the SIB from the neighbor cell ($gNB_2$).

If the measured signal strength exceeds the threshold and the neighbor cell belongs to a different MBSFN area or different PLMN, the broadcast UE would go into a connected state, obtain the CTS resource configuration from the serving cell and transmit CTS. The serving base station ($gNB_1$) may configure the resources for either of the broadcast UEs ($UE_1$ and $UE_2$) to send CTS so that the neighbor cell ($gNB_2$) can measure the individual cross-link channel accordingly to obtain the orthogonal beam in the null space of the broadcast communications. The serving base station ($gNB_1$) may have CTS reuse among different broadcast UEs based on its measurements to increase the CTS multiplexing capability. Moreover, the threshold can be configured by the serving base station ($gNB_1$) and broadcast to the broadcast UEs. The threshold can be based on the target modulation and coding scheme (MCS) for the broadcast/multicast service.

$UE_1$ and $UE_2$ are receiving broadcast communications, such as a broadcast/multicast service, from $gNB_1$. The broadcast link is a 1×1 transmit antenna for both $UE_1$ and $UE_2$. $gNB_2$ is a neighbor cell that does not belong to the same MBSFN area as $gNB_1$, and $gNB_2$ to $UE_3$ is a link with a 2×2 antenna. According to the illustrated example, $UE_1$ does not see a strong signal from $gNB_2$, thus, it would not transmit CTS. However, $UE_2$ sees strong interference from $gNB_2$ that exceeds the threshold signal strength. In response to the signal interference exceeding the threshold, $UE_2$ switches into connected state and transmits CTS. $gNB_2$ sees the cross-link channel $G_2$ from $UE_2$ and can then transmit on the null space to its own $UE_3$. Since the cross-link channel $G_2$ is a 1×2 link, $gNB_2$ has the additional degree of freedom to transmit a stream to $UE_3$ while nulling out its interference to $UE_2$. If $UE_2$ does not transmit CTS, $gNB_2$ either has to yield its transmission or $gNB_2$ may introduce significant interference on $UE_2$.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 7, and 9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   measuring, by a user equipment (UE) configured for reception of broadcast communications from a broadcast transmitter, a first signal strength for each of one or more neighboring base stations, wherein the UE is configured to perform the measuring while the UE is in a disconnected state;
   entering, by the UE, a connected state from the disconnected state, with a serving base station and in response to the first signal strength of at least one of the one or more neighboring base stations, other than the serving base station, exceeding a threshold signal strength, wherein the threshold signal strength is a predetermined amount below a second signal strength of the serving base station, wherein the threshold signal strength is exceeded by the first signal strength when a first difference between the second signal strength and the first signal strength is less than a second difference between the second signal strength and the threshold signal strength, and wherein the threshold signal strength corresponds to a signal strength value known to interfere with broadcast reception at the UE; and
   transmitting, by the UE, a broadcast clear-to-send (CTS) signal to the one or more neighboring base stations, other than the serving base station, once entered into the connected state with the serving base station.

2. The method of claim 1, further including:
   obtaining, by the UE, identification information regarding each of the one or more neighboring base stations prior to the measuring, wherein the obtaining includes one of:
      acquiring the identification information from a system information broadcast transmitted by the one or more neighboring base stations; or
      receiving the identification information from the serving base station of the UE.

3. The method of claim 1, further including:
   obtaining, by the UE, a resource allocation from the serving base station for the transmitting the broadcast CTS signal.

4. The method of claim 1, further including:
   receiving, by the UE, the threshold signal strength from the serving base station.

5. The method of claim 1, wherein transmitting the broadcast CTS signal to the one or more neighboring base stations other than the serving base station is performed to allow the one or more neighboring base stations to determine an orthogonal beam for spatial listen before talk (LBT) transmissions.

6. The method of claim 1, wherein entering the connected state from the disconnected state is further in response to a determination that at least one of the one or more neighboring base stations having a first signal strength that exceeds the threshold signal strength belongs to a different multicast-broadcast single frequency network (MBSFN) from the serving base station.

7. The method of claim 1, further including
   obtaining, by the UE, identification information regarding each of the one or more neighboring base stations prior to measuring the first signal strength of each of the one or more neighboring base stations.

8. The method of claim 7, wherein obtaining the identification information includes acquiring identification information from a system information broadcast transmitted by the one or more neighboring base stations.

9. The method of claim 7, wherein obtaining the identification information includes receiving the identification information from the serving base station of the UE.

10. An apparatus configured for wireless communication, the apparatus comprising:
at least one processor of a user equipment (UE) configured for reception of broadcast communications from a broadcast transmitter; and
a memory coupled to the at least one processor,
wherein the at least one processor is configured to enable the UE:
to measure a first signal strength for each of one or more neighboring base stations while the UE is in a disconnected state;
to enter a connected state from the disconnected state with a serving base station and in response to the first signal strength of at least one of the one or more neighboring base stations, other than the serving base station, exceeding a threshold signal strength, wherein the threshold signal strength is a predetermined amount below a second signal strength of the serving base station, wherein the threshold signal strength is exceeded by the first signal strength when a first difference between the second signal strength and the first signal strength is less than a second difference between the second signal strength and the threshold signal strength, and wherein the threshold signal strength corresponds to a signal strength value known to interfere with broadcast reception at the UE; and
to transmit a broadcast clear-to-send (CTS) signal to the one or more neighboring base stations other than the serving base station once entered into the connected state.

11. The apparatus of claim 10, wherein the at least one processor is further configured to enable the UE to obtain identification information regarding each of the one or more neighboring base stations prior to measuring the first signal strength, wherein the configuration of the at least one processor to enable the UE to obtain the identification information includes the configuration to enable the UE to one of:
acquire the identification information from a system information broadcast transmitted by the one or more neighboring base stations; or
receive the identification information from the serving base station of the UE.

12. The apparatus of claim 10, wherein the at least one processor is further configured to enable the UE to obtain a resource allocation from the serving base station for the transmitting the broadcast CTS signal.

13. The apparatus of claim 10, wherein the at least one processor is further configured to enable the UE to receive the threshold signal strength from the serving base station.

14. The apparatus of claim 10, wherein the at least one processor is further configured to enable the UE to:
determine whether at least one of the one or more neighboring base stations having a first signal strength that exceeds the threshold signal strength belongs to a different multicast-broadcast single frequency network (MBSFN) or public land mobile network (PLMN) from the serving base station,
wherein entering, by the UE, the connected state with the serving base station is further in response to the determination that at least one of the one or more neighboring base stations belongs to a different MBSFN or PLMN from the serving base station.

15. The apparatus of claim 10, wherein the at least one processor is configured to enable the UE to transmit the broadcast CTS signal to the one or more neighboring base stations other than the serving base station to allow the one or more neighboring base stations to determine an orthogonal beam for spatial listen before talk (LBT) transmissions.

16. A non-transitory computer-readable medium having instructions recorded thereon that, when enacted by one or more computer processors, cause the one or more computer processors to:
measure, by a user equipment (UE) configured for reception of broadcast communications from a broadcast transmitter, a first signal strength for each of one or more neighboring base stations while the UE is in a disconnected state;
enter, by the UE, a connected state from the disconnected state, with a serving base station and in response to the first signal strength of at least one of the one or more neighboring base stations, other than the serving base station, exceeding a threshold signal strength, wherein the threshold signal strength is a predetermined amount below a second signal strength of the serving base station, wherein the threshold signal strength is exceeded by the first signal strength when a first difference between the second signal strength and the first signal strength is less than a second difference between the second signal strength and the threshold signal strength, and wherein the threshold signal strength corresponds to a signal strength value known to interfere with broadcast reception at the UE; and
transmit, by the UE, a broadcast clear-to-send (CTS) signal to the one or more neighboring base stations other than the serving base station once entered into the connected state with the serving base station.

17. The non-transitory computer-readable medium of claim 16, further having instructions recorded thereon that, when enacted by the one or more computer processors, cause the one or more computer processors to:
obtain, by the UE, identification information regarding each of the one or more neighboring base stations prior to the measuring, wherein the obtaining includes one of:
acquiring the identification information from a system information broadcast transmitted by the one or more neighboring base stations; or
receiving the identification information from the serving base station of the UE.

18. The non-transitory computer-readable medium of claim 16, further having instructions recorded thereon that, when enacted by the one or more computer processors, cause the one or more computer processors to:
obtain, by the UE, a resource allocation from the serving base station for the transmitting the broadcast CTS signal.

19. The non-transitory computer-readable medium of claim 16, further having instructions recorded thereon that, when enacted by the one or more computer processors, cause the one or more computer processors to:
receive, by the UE, the threshold signal strength from the serving base station.

20. The non-transitory computer-readable medium of claim 16, further having instructions recorded thereon that, when enacted by the one or more computer processors, cause the one or more computer processors to:
determine whether at least one of the one or more neighboring base stations having a first signal strength that exceeds the threshold signal strength belongs to a different multicast-broadcast single frequency network (MBSFN) or public land mobile network (PLMN) from the serving base station,
wherein entering the connected state is further in response to the determination that at least one of the one or more neighboring base stations belongs to a different MBSFN or PLMN from the serving base station.

\* \* \* \* \*